United States Patent

Nagaya

[11] Patent Number: 5,985,442
[45] Date of Patent: Nov. 16, 1999

[54] FUNCTIONAL MAT AND ITS MANUFACTURING METHOD

[75] Inventor: Megumi Nagaya, Hashima, Japan

[73] Assignee: Maruwa Co., Ltd., Gifu-ken, Japan

[21] Appl. No.: 08/871,191

[22] Filed: Jun. 9, 1997

[30] Foreign Application Priority Data

Jun. 19, 1996 [JP] Japan ................................. 8-158265

[51] Int. Cl.$^6$ ................................................. B32B 19/00
[52] U.S. Cl. ................................ 428/357; 428/95; 428/96; 428/98; 428/102; 428/198; 428/358; 428/365; 428/374; 428/423.3; 442/400; 442/401; 442/404; 442/409
[58] Field of Search ............................ 428/98, 198, 102, 428/95, 96, 423.3, 358, 365, 374, 357; 442/400, 417, 401, 402, 404, 409; 5/484, 485, 502, 641

[56] References Cited

U.S. PATENT DOCUMENTS

| 4,192,086 | 3/1980 | Slchahk ................................. 36/44 |
| 4,217,386 | 8/1980 | Arons et al. ......................... 428/198 |
| 5,092,008 | 3/1992 | Okubo .................................... 5/404 |

FOREIGN PATENT DOCUMENTS

| 58-148754 | 9/1983 | Japan . |
| 61-144882 | 9/1986 | Japan . |
| 63-126441 | 5/1988 | Japan . |
| 63-59686 | 11/1988 | Japan . |
| 64-51463 | 3/1989 | Japan . |
| 4-38790 | 9/1992 | Japan . |
| 06280317 | 10/1994 | Japan . |

*Primary Examiner*—Deborah Jones
*Assistant Examiner*—Abraham Bahta
*Attorney, Agent, or Firm*—D. Peter Hochberg

[57] ABSTRACT

A wall lining material consists of an upper mat body, a lower mat body and a granular moisture absorbent. The upper mat body and the lower mat body are made of a nonwoven fabric containing a multiplicity of fibers. The moisture absorbent is located between these two mat bodies. The mat bodies are sewn together over the laminated portion at many points by means of needle punching. This needle punching causes the fibers in the upper mat body to be connected with those in the lower mat wed and vice versa.

4 Claims, 2 Drawing Sheets

FUNCTIONAL MAT AND ITS MANUFACTURING METHOD

BACKGROUND OF THE INVENTION

1. Field of the Invention

The present invention relates generally to a mat employed, for example, as building interior material and components of household commodities, and more particularly, to a mat having absorbs moisture and deodorizes, as well as, to a process for producing the same.

2. Description of the Related Art

Generally, rooms in concrete buildings are highly airtight. The high room airtightness readily induces dew condensation in the room and results in insufficient ventilation of the room. Humidity in the room adversely affects the interior wall and furniture. In order to solve these problems, mats containing moisture absorbents such as silica gel and/or deodorants such as activated carbon are utilized as building interior materials such as for flooring (wall-to-wall) carpets and wall lining materials. Three conventional techniques given below are known as silica gel-containing wall lining materials.

A wall lining material to be formed according to a first conventional technique is composed of a plywood core material, granular silica gel and a sheet. The core material contains a plurality of holes opening on one side thereof. These holes are filled with silica gel, and the openings of the holes are covered with an air-permeable sheet such as a nonwoven fabric. The thus formed wall lining material is applied to the concrete wall surfaces such that the sheet is exposed to the room. The silica gel contained in the holes absorbs moisture in the room through the sheet to prevent dew condensation in the room from occurring.

The wall lining material formed according to a second conventional technique is composed of two sheets of fabric having air permeability and granular silica gel. These two sheets are sewn up together by threads with the silica gel being interposed therebetween. The sheets are sewn up together such that a plurality of pockets are defined therebetween and such that the silica gel is contained in each pocket. Like the first conventional technique, this wall lining material is applied to the concrete wall surfaces such that one sheet is exposed to the room. Thus, the silica gel in the pockets absorbs the moisture in the room through the sheet.

The wall lining material formed according to a third conventional technique is composed of two mat bodies made of air-permeable nonwoven fabric and granular silica gel. The two mat bodies are adhered to each other by an adhesive with a silica gel layer being sandwiched between them. Like the first and second conventional techniques described above, this wall lining material is applied to the concrete wall surfaces such that one mat body is exposed to the room. Thus, the silica gel sandwiched between two mat bodies absorbs the moisture in the room through the mat body.

However, the wall lining materials according to the conventional techniques described above involve the following problems. In the first conventional technique, the silica gel having moisture absorbing function is present only in some holes defined on one side of the core material. The total area of the holes occupying the entire wall lining material is very small, so that the moisture absorbing function of silica gel cannot be fully employed. In order to increase the moisture absorbing area, the number of holes defined on one side of the core material or the area of each hole can be increased. However, this reduces in the strength of the core material. Accordingly, there is a limitation in increasing the number of holes or the area of each hole. Further, the portion of silica gel present at the bottom of each hole cannot fully function to absorb moisture compared with that portion adjacent to the opening of the hole.

In the second conventional technique, if the sheet is applied to the concrete wall surface, the silica gel contained in each pocket gathers at the bottom of the pocket to form a lump, which results in an irregular wall surface and deteriorates the appearance of the wall surface. Further, in the second conventional technique, the moisture absorbing area of the wall lining material is reduced if the silica gel gathers at the bottom of each pocket.

In the third conventional technique, since the mat bodies are adhered to each other by an adhesive, the adhesive is applied on the surface of the silica gel. This adhesive greatly reduces moisture absorbing function of the silica gel. Silica gel has a multiplicity of fine holes on its surface, which absorb moisture by the capillary phenomenon. However, the adhesive blocks these fine holes present on the surface of silica gel.

SUMMARY OF THE INVENTION

It is an objective of the present invention to allow the functional material such as a moisture absorbent typified by silica gel and/or a deodorant typified by activated carbon in a functional mat to greatly enhance its function and also to facilitate production of the mat.

In order to solve the problems described above, the functional mat according to the present invention consists of a first mat body made of a nonwoven fabric; a second mat body also made of a nonwoven fabric; the first mat body and the second mat body containing webs respectively; and a number of granules of functional substance to be located between the first mat body and the second mat body; the first and second mat bodies being laminated and sewn up together at many points over the laminated portion.

BRIEF DESCRIPTION OF THE DRAWINGS

The features of the present invention that are believed to be novel are set forth with particularity in the appended claims. The invention, together with i:he objects and advantages thereof, may best be understood by reference to the following description of the presently preferred embodiments together with the accompanying drawings in which:

DETAILED DESCRIPTION OF THE PREFERRED EMBODIMENTS

A mat used in a wall lining material according to one embodiment of the present invention will be described below referring to FIGS. 1 and 2.

Figure 1:
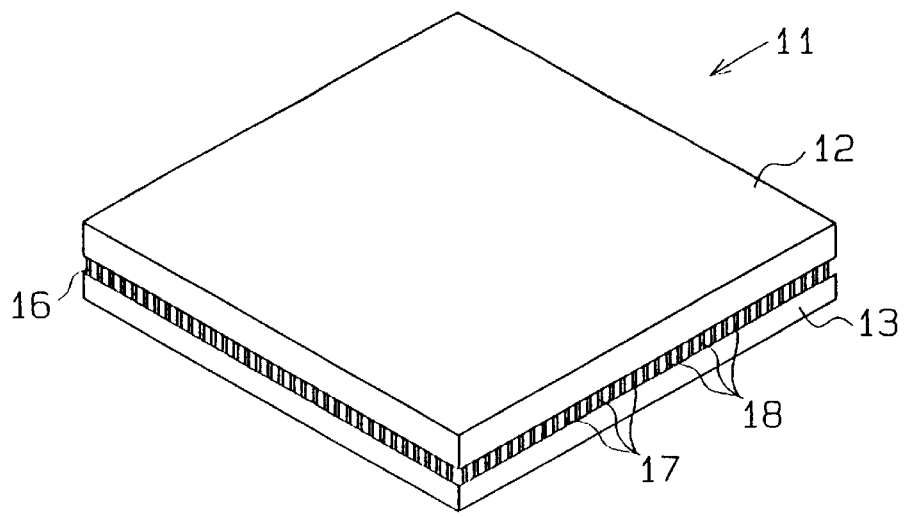
FIG. 1 is a perspective view of the wall lining material according to one embodiment of the present invention, which is cut into predetermined dimensions.

As shown in FIG. 1, a wall lining material 11, which is one interior building material, contains a pair of mat bodies 12 and 13 made of a nonwoven fabric and a large amount of granular silica gel 16. As shown in FIG. 2, the granular silica gel 16 is sandwiched between a face 14 of the mat body 12 and an opposing face 15 of the mat body 13. Each granule of the silica gel 16 has a multiplicity of fine through holes (not shown). While silica gel 16 absorbs moisture in air by surface adsorption or by capillary phenomenon under high-humidity atmospheric conditions, it can desorb the moisture under dry atmospheric condition. Accordingly, in order to obtain excellent moisture absorbing function and moisture desorption function, a silica gel 16 having a very small porosity of 0.5 to 1.0 ml/g and a surface area of 650 to 350 $m^2/g$ is employed. Referring to the moisture absorbing function, the through holes preferably have a diameter of 30 to 120 Å.

Figure 2:
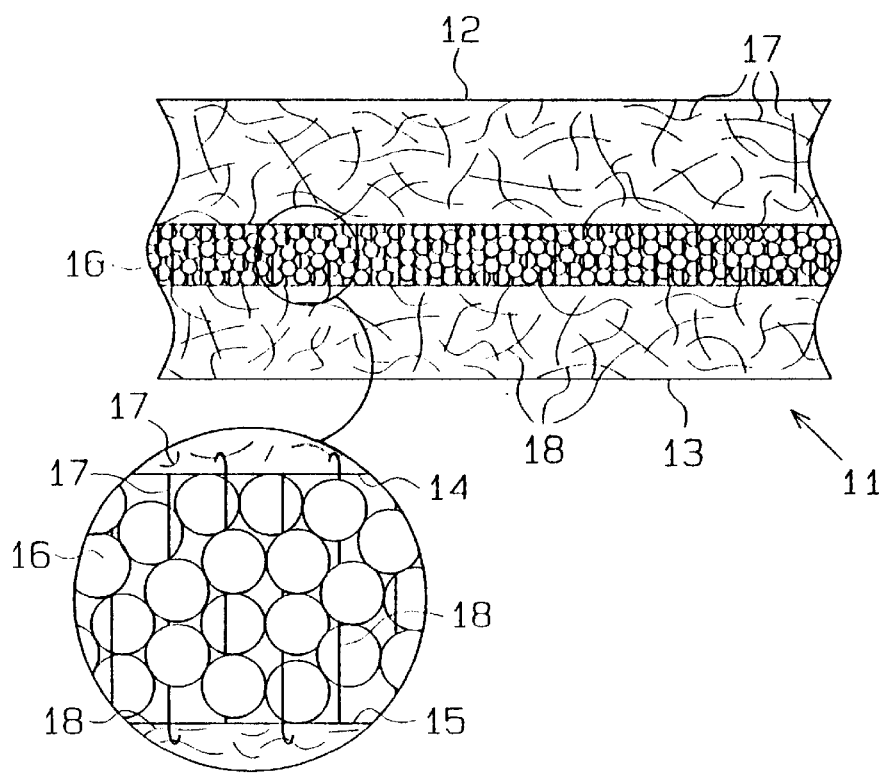
FIG. 2 is an enlarged cross-sectional view of the wall lining material.

As shown in FIG. 2, the silica gel 16 assumes a form of layer between the mat bodies 12 and 13 and is distributed uniformly such that the layer has a substantially uniform thickness. The upper mat body 12 and the lower mat body 13 contain fibers 17 and 18 respectively. As the enlarged view in FIG. 2 shows, the fibers 17 of the upper mat body 12 are connected via the silica gel 16 with the lower mat body 13, while the fibers 18 of the lower mat body 13 are connected via the silica gel 16 with the upper mat body 12. In order to achieve such connection between these fibers 17 and 18, the mat bodies 12 and 13 are subjected to needle punching at strategic points. The connection of the fibers 17 and 18 not only joins the mat bodies 12, 13 but also immobilizes the silica gel 16 therebetween.

A process for producing the wall lining material will be described below referring to FIGS. 3 to 5.

Figure 3:
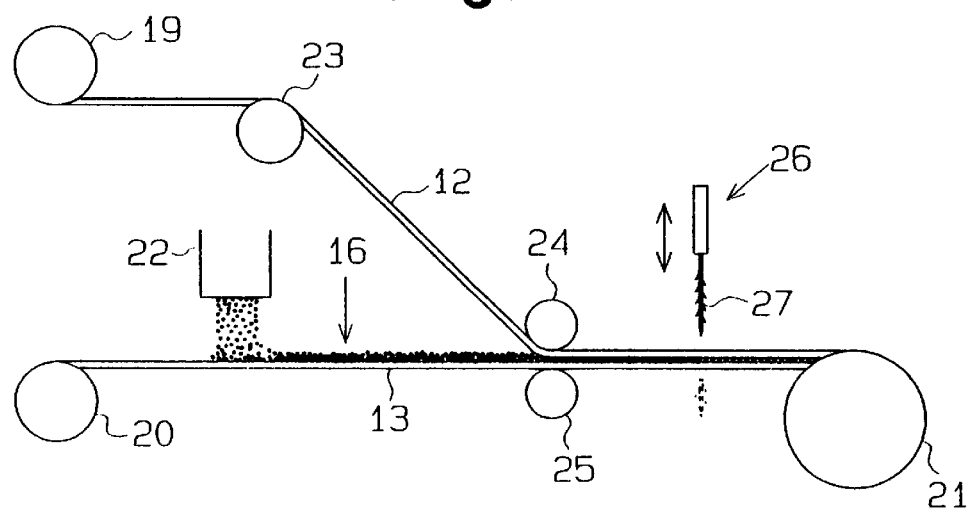
FIG. 3 is a schematic illustration of a line for producing wall lining materials.

As shown in FIG. 3, an upper roll 19 for supplying the upper mat body 12 and a lower roll 20 for supplying the lower mat body 13 are rotatably supported respectively on the upstream side (left side in FIG. 3) of the production line. A take-up roll 21 is rotatably supported on the downstream side (right side in FIG. 3) of the production line. These rolls 19, 20 and 21 are driven by a drive control mechanism (not shown). The mat bodies 12 and 13 are fed to the right (in FIG. 3) by the rotation of the rolls 19 and 20, A guide roller 23 for guiding the upper mat body 12 is located on the lower side of the upper mat body 12. A pair of press rollers 24 and 25 for pressing the mat bodies 12 and 13 together are located on the upper side of the upper mat body 12 and the lower side of the lower mat body 13, respectively.

A hopper 22 for distributing the silica gel 16 is located on the downstream side of the lower roll 20 and above the feeding route of the lower mat body 13 supplied from the lower roll 20. A large quantity of the silica gel 16 is stored beforehand in the hopper 22. The hopper 22 distributes the silica gel 16 onto the lower mat body 13 when it passes under the hopper 22 to form a silica gel layer thereon.

The upper mat body 12 supplied from the upper roll 19 is guided by the guide roller 23 diagonally downward. When the upper mat body 12 and the lower mat body 13 pass between the press rollers 24 and 25, the upper mat body 12 is laminated onto the lower mat body 13 having the silica gel 16 distributed thereon. In other words, when the mat bodies 12 and 13 passes between the press rollers 24 and 15, the silica gel 16 is sandwiched between the mat bodies 12 and 13. At this point, the upper mat body 12 and the lower mat body 13 are not sewn together.

As shown in FIG. 3, a needle punching device 26 is located on the feeding route of the mat bodies 12 and 13 substantially midway between the press rollers 24 and 25 and the take-up roller 21. This punching device 26 has a plurality of needles 27, which are arranged in a row along the width of the mat bodies 12 and 13. When the punching device 26 is driven, these needles 27 are all reciprocated vertically. The laminated mat bodies 12 and 13 are punched at plural points by these needles 27 when they pass under the punching device 26.

Figure 4:
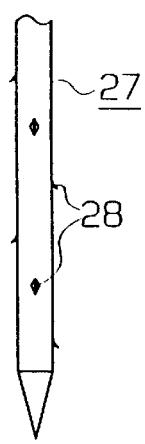
FIG. 4 is a front view showing the major portion of a needle.
Figure 5:
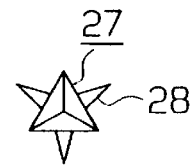
FIG. 5 is a lower end view of the needle.

As shown in FIGS. 4 and 5, a plurality of thorns 28 protrude from the barrel of each needle 27. When the needles 27 penetrate the mat bodies 12 and 13, the thorns 28 catch the fibers 17 or 18 from one mat 12 or 13 to pull end portions out of each mat body and to allow the end portions thereof to be engaged with the fibers 18 or 17 in the other mat body 13 or 12. More specifically, in FIG. 3, when the needles 27 descend to penetrate the mat bodies 12 and 13, the thorns 28 of each needle 27 pull end portions of the fibers 17 in the upper mat body 12 to bring them in engagement with the fibers 18 in the lower mat body 13. On the other hand, when the needles 27 ascend to penetrate the mat bodies 13 and 12, the thorns 28 of each needle 27 pull end portions of the fibers 18 in the lower mat body 13 to bring them in engagement with the fibers 17 in the upper mat body 12. This punching procedures achieves sewing of the mat bodies 12 and 13 together by connection between the fibers 17 and 18 of the mat bodies 12 and 13.

The wall lining material 11 can be fabricated as described above in detail. Then, the wall lining material 11 is taken up successively by the take-up roller 21. The wall lining material 11 taken up by the take-up roller 21 is cut into suitable dimensions for use.

The wall lining material 11 according to the first embodiment and the process for producing the same have the following effects.

Since a layer of the silica gel 16 is formed so as to have a uniform thickness between the mat bodies 12 and 13, the entire surface of the wall lining material 11 absorbs moisture. Accordingly, humidity control in interior spaces can be achieved effective by applying this wall lining material 11 on the interior walls.

The mat bodies 12 and 13 and the fibers 17 and 18 extended between the mat bodies 12 and 13 restrict dislocation of the silica gel 16. Accordingly, even if the wall lining material 11 is applied to the wall surface, the silica gel 16 does not slip down to the bottom. Thus, the area which can exhibit moisture absorbing area is maintained.

The mat bodies 12 and 13 are sewn together by their constituent fibers 17 and 18, without employing adhesive. Accordingly, the moisture absorbing function of the silica gel 16 is effectively maintained without being blocked by adhesive. When extra threads are to be employed for sewing up the mat bodies, it is required that the positions where the mat bodies are sewn be determined, threads be set, and so on. However, since no extra thread or the like is required for sewing the mat bodies 12 and 13 together in the first embodiment, the wall lining material 11 can be fabricated speedily and easily. In addition, the cost of producing the wall lining material 11 is reduced. Furthermore, since the fibers 17 and 18 are connected with one another, the mat bodies 12 and 13 are firmly sewn together.

Since the mat bodies 12 and 13 are sewn together by a multiplicity of punching needles, the silica gel 16 is prevented from spilling out no matter where the wall lining material 11 is cut.

The above embodiment may be modified as follows.

Figure 6:
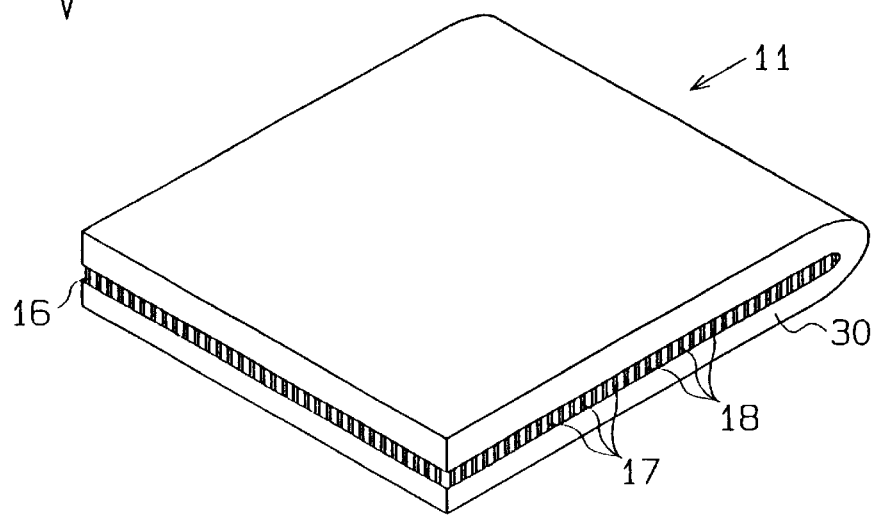
FIG. 6 is a perspective view of the wall lining material according to another embodiment of the present invention.

The two mat bodies 12 and 13 may be replaced with one mat body 30 as shown in FIG. 6. In this case, the mat body 30 is folded so as to sandwich the silica gel 16 therein.

Three or more mat bodies may be laminated. In this case, the silica gel 16 may be sandwiched between every opposed two mat bodies.

While the mat bodies 12 and 13 are subjected to punching while feeding them in the above embodiment, the punching may be carried out with the mat bodies 12 and 13 assuming a static state. In this case, the plurality of needles 27 arranged in a row along the width of the mat bodies 12 and 13 may be moved. Alternatively, a punching device having a plurality of needles arranged in rows and columns over a wide range may be employed. Otherwise, operators may carry out punching manually using needles 27 directly.

The mat bodies 12 and 13 may be sewn up not by the connection of the fibers 17 and 18 but by extra threads. Further, the mat bodies 12 and 13 may have on their surface a shape retaining material, a buffer material or the like bonded thereon.

The silica gel 16 used in the above embodiment may be replaced with grains of deodorant such as activated carbon or grains of a substance that emits far infrared radiation. In the case where a granular activated carbon is employed, the resulting wall lining material 11 comes to have deodorizing function. In the case where a granular ceramic is employed, the resulting wall lining material 11 comes to have heat radiating function.

The mat according to the present invention is not be limited to wall lining material 11 but may be embodied in other building interior materials such as flooring (wall-to-wall) and carpets. Further, the mat of the present invention may be used as a component of household commodities such as rugs and bedclothes.

Although only several embodiments of the present invention has been described herein, it should be apparent to those skilled in the art that the present invention may be embodied in many other specific forms without departing from the spirit or scope of the invention. Therefore, the present example and embodiment are to be considered as illustrative and not restrictive, and the invention is not to be limited to the details given herein, but may be modified within the scope of the appended claims.

What is claimed is:

1. A functional mat comprising:

a first mat body made of a nonwoven fabric;

a second mat body also made of a nonwoven fabric;

said first mat body and said second mat body containing fibers respectively;

gel means for absorption and desorption of moisture, said gel means being formed as a plurality of granules and being substantially uniformly distributed in a layer interposed between said first mat body and said second mat body; and said first mat body and said second mat body being laminated and sewn together by needle punching applied at a plurality of points over the laminated portion, so that the fibers contained in said first mat body and in said second mat body are entangled with one another.

2. A functional mat as set forth in claim 1, wherein said granules are immovably held by the entangled fibers.

3. A functional mat comprising:

a mat body made of a nonwoven fabric, said nonwoven fabric containing a plurality of fibers;

gel means for absorption and desorption of moisture, said gel means being substantially uniformly distributed in a layer;

said mat body being folded, so as to sandwich said layer therein; and said mat body being laminated and sewn together by needle punching applied at a plurality of points over the laminated portion, so that the fibers are entangled with one another.

4. A functional mat as set forth in claim 3, wherein said gel means are formed as a plurality of granules, and wherein said granules are immovably held by the entangled fibers.

\* \* \* \* \*